F. McCORMICK.
BEARINGS FOR CARD-GRINDERS.

No. 174,271. Patented Feb. 29, 1876.

Witnesses
Harry Hayson Jr
Harry Smith

Francis McCormick
by his Attorneys
Howson and Son

UNITED STATES PATENT OFFICE.

FRANCIS McCORMICK, OF PHILADELPHIA, PENNSYLVANIA.

IMPROVEMENT IN BEARINGS FOR CARD-GRINDERS.

Specification forming part of Letters Patent No. 174,271, dated February 29, 1876; application filed February 10, 1876.

*To all whom it may concern:*

Be it known that I, FRANCIS MCCORMICK, of Philadelphia, Pennsylvania, have invented certain Improvements in Bearings for Card-Grinders, of which the following is a specification:

My invention relates to an improvement in bearings for the journals of the grinding-disks which are applied to carding-machines for the purpose of sharpening the teeth of the card-cylinders; and the object of my invention is to so construct these bearing that they may be permanently attached to the frame of the machine without interfering with its operations. This object I obtain in the manner which I will now proceed to describe, reference being had to the accompanying drawing, in which—

Figure 1:
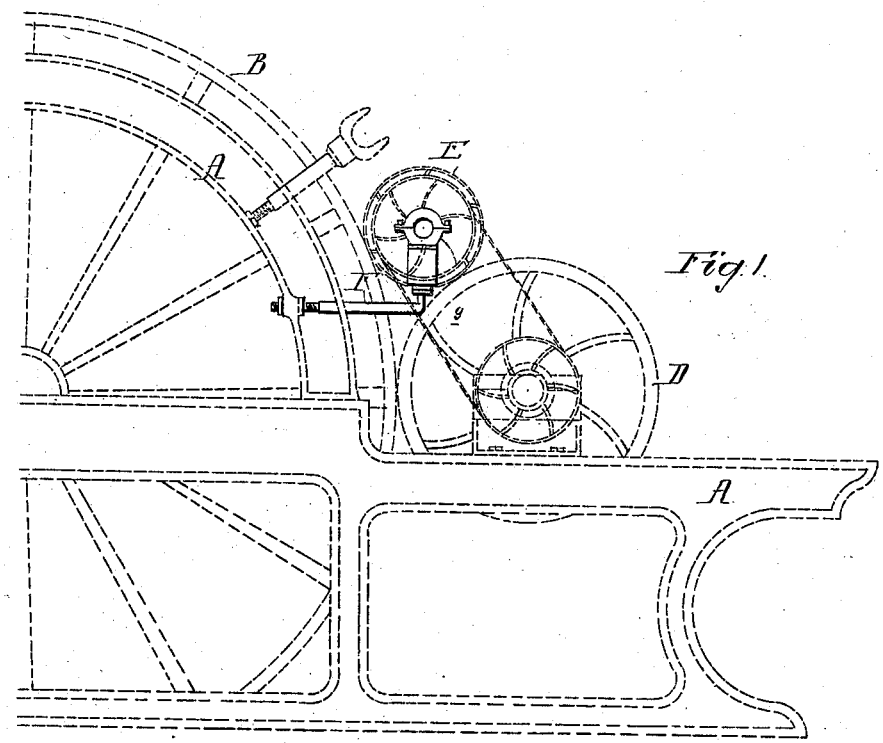
Figure 2:
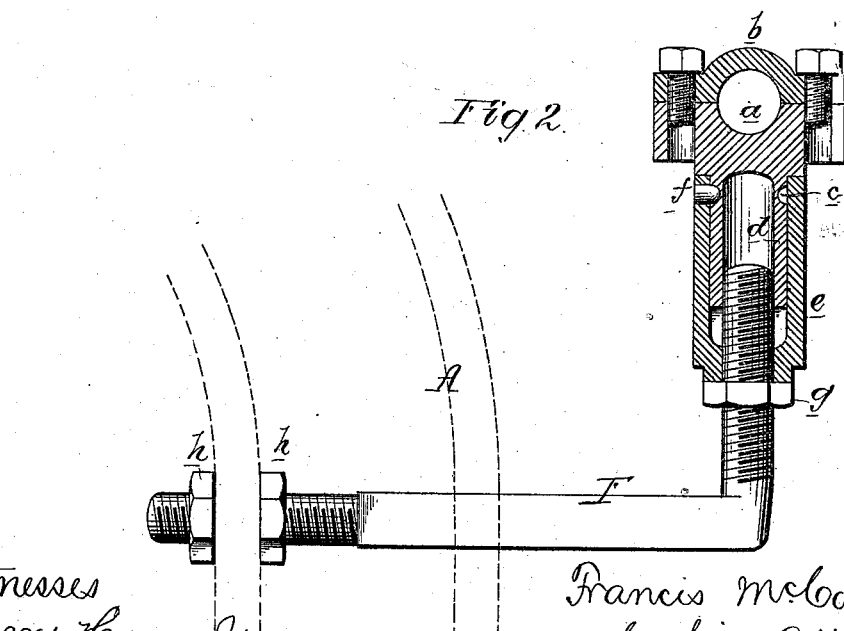

Figure 1 is a side view, illustrating the application of my improved bearing to the frame of a carding-machine, and Fig. 2 a vertical section of the bearing.

A represents one of the side frames of a carding-machine; B, the carding-cylinder; D, the doffer, and E the grinding-disk, the latter being revolved in the present instance by power imparted to its spindle from the shaft of the doffer. As the disk is revolved it acts upon the teeth of both cylinders B and D in the usual manner. The bearing $a$ has a removable cap, $b$, and is provided with a tubular projection, $d$, adapted to a sleeve, $e$, within which it is confined vertically (but so that it can turn freely) by means of a pin, $f$, projecting into a groove, $c$, in the said projection, the bearing being thus connected to the sleeve by a swivel-joint. The sleeve $e$ is adapted at its lower end to the vertical threaded portion of an angular arm F, a jam-nut, $g$, on which serves to secure the sleeve in any position to which it is adjusted. The horizontal portion of the arm F passes through suitable openings in the frame of the machine, to which it is secured so as to be readily adjustable longitudinally by means of nuts $h\ h$, adapted to the threaded end of the arm. The grinding-disk and its spindle can be readily applied to or removed from the bearing by removing the cap $b$, without disturbing any other of the parts of the bearing, which, owing to the shape of the arm, can be allowed to remain on the frame, as it will not interfere with the ordinary operations of the machine. After the spindle of the grinder has been inserted into its place, it may be readily adjusted, either longitudinally, by means of the nuts $h$ and $h'$, or vertically for manipulating the sleeve $e$.

I claim as my invention—

The combination of the arm F, adapted to the frame of a carding-machine so as to be adjustable thereon, with the bearing $a$ and adjustable sleeve $e$, all as set forth.

In testimony whereof I have signed my name to this specification in the presence of two subscribing witnesses.

FRANCIS McCORMICK.

Witnesses:
HARRY HOWSON, Jr.,
HARRY SMITH.